United States Patent [19]
Oude Alink

[11] 3,904,625
[45] Sept. 9, 1975

[54] USE OF ION EXCHANGE RESINS IN PREPARING TETRAHYDROPYRIMIDINES
[75] Inventor: Bernardus A. Oude Alink, St. Louis, Mo.
[73] Assignee: Petrolite Corporation, St. Louis, Mo.
[22] Filed: Apr. 8, 1974
[21] Appl. No.: 459,157

[52] U.S. Cl............................................. 260/251 R
[51] Int. Cl.².................................... C07D 239/00
[58] Field of Search ............................... 260/251 R

[56] References Cited
UNITED STATES PATENTS
3,538,096    11/1970    Petersen....................... 260/251 R Primary Examiner—Elbert L. Roberts
Attorney, Agent, or Firm—Sidney B. Ring; Hyman F. Glass

[57] ABSTRACT

This invention relates to the use of ion exchange resin as a catalyst in the preparation of substituted 2, 3, 4, 5-tetrahydropyrimidines (THP)

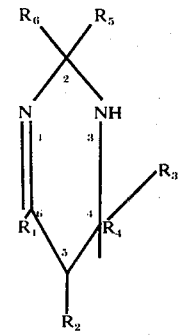

Formula I by reacting a carbonyl compound (ketone or aldehyde) with ammonia.

The catalyst besides giving excellent yields can be repeatedly employed with little change in yield or activity.

THP and derivatives thereof are useful as biocides, anti-oxidants, oxygen scavengers, corrosion inhibitors, fuel additives, etc.

12 Claims, No Drawings

USE OF ION EXCHANGE RESINS IN PREPARING TETRAHYDROPYRIMIDINES

Ser. No. 292,494 filed Sept. 27, 1972 relates to tetrahydropyrimidines (THP), to the preparation thereof with or without novel catalysts; uses thereof; and to derivatives thereof.

According to Ser. No. 292,494 THP is prepared by reacting a carbonyl compound (aldehyde or ketone) with ammonia according to the general reaction:

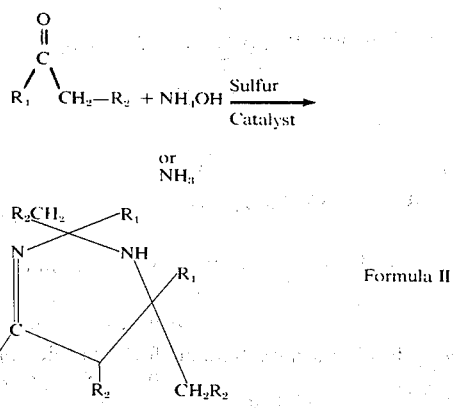

Formula II $R_1$, $R_2$, $R_3$, $R_4$, $R_5$ and $R_6$ of Formulas I and II, which may be the same or different, are hydrogen or substituted group such as alkyl, aryl, cycloalkyl, alkaryl, aralkyl, heterocyclic, substituted derivatives thereof, etc. In addition R groups may be joined in a cyclic configuration which makes the THP structure a part of the substituted group.

Alkyl includes methyl, ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, escosyl, docosyl, etc., for example having about 1-25 or more carbons such as from about 1-18 carbons, but preferably about 1-12 carbons. The term "alkyl" also includes isomers of the straight chain where branching occurs.

Cycloalkyl includes cyclopentyl, cyclohexy, etc., and derivatives thereof such as alkyl cyclohexyl, dialkylcyclohexyl, etc.

Aryl, alkaryl and aralkyl include phenyl, alkylphenyl, polyalkylphenyl, chlorophenyl, alkoxyphenyl, naphthyl, alkylnaphthyl, etc., benzyl, substituted benzyl, etc.

The joining of the R groups into a ring structure includes those structures derived from reactants of the general formula

such as cyclohexanone, cyclopentanone, substituted derivatives thereof such as alkylcyclohexanone, dialkyl-cyclohexanone.

In general, the catalyst employed in Ser. No. 292,494 is a sulfur or a sulfur-containing compound. The preferred catalyst is carbon disulfide or the reaction product of $CS_2$ with an amine to yield an xanthate of the general formula

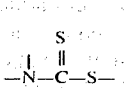

particularly as a salt thereof.

The groups substituted on the nitrogen of the xanthate can vary widely for example, alkyl, cycloalkyl, aryl, alkaryl, aralkyl, heterocyclic, etc.

The salt moiety can also vary widely for example alkali metal Na, K, Li, etc., alkali earth, Ca, etc., metal, $NH_4$, amine, etc.

In the preferred embodiment of Ser. No. 292,494, $CS_2$ forms an xanthate inner salt with the tetrahydropyrimidines of this invention such as

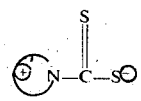

where

represents the tetrahydropyrimidine ring having a charged amino group for example

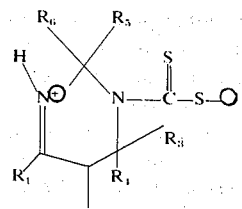

The catalyst in Ser. No. 292,494 is employed in a concentration of at least about 0.05 mole percent of the reactants, such as from about 0.05 – 3.0 mole percent, for example from about 0.1 to 2.0 mole percent, but preferably from about 0.3 to 0.5 mole percent. Larger amounts can be employed, if desired, but there is generally no advantage in doing so.

In general, the reaction of Ser. No. 292,494, which is mildly exothermic, is carried out at ambient temperatures. Although elevated temperatures can be employed, the reaction is generally carried out at room temperature. Although elevated pressures can be employed such as from 0 – 100 psi, the reaction can be carried out at atmospheric pressure.

In contrast to the process of Ser. No. 292,494 which employs a homogeneous catalyst, I have now discovered that THP can be prepared from carbonyl-containing compounds (ketones and aldehydes) and ammonia by employing an insoluble ion exchange resin catalyst. This catalyst produces high yields with short reaction times and can be repeatedly employed with little, if any, change in yields or activity.

Thus, this invention relates to the preparation of tetrahydropyrimidines from carbonyl containing compounds (ketones and aldehydes), ammonia and a heterogeneous ion exchange resin catalyst.

The ion exchange catalyst is preferably an anionic resin such as a sulfonated resin, for example, a sulfonated polystyrene copolymer (commercially available as Rexyn, Amberlite) or a poly-carboxylate.

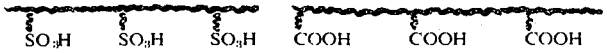

The protons on the resin are exchanged for $NH_4^+$ to give the catalysts

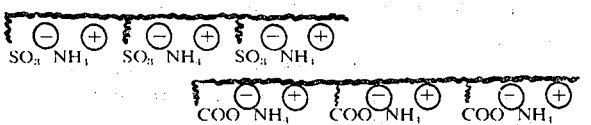

The reaction can be written as:

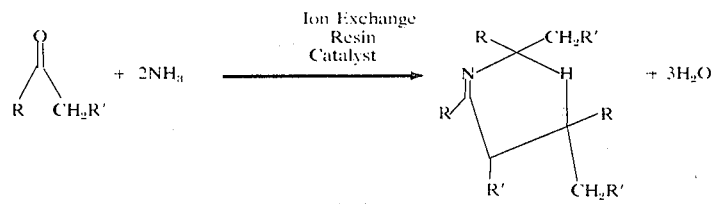

The R values are the same as those stated above in Formulas I and II.

The reactions are generally exothermic. The catalyst can be used over and over again (after reusing the same catalyst 25 X no change in yield or activity was shown) and since it is heterogeneous easily removed by filtration. Reaction times are short. The process is superior to a homogeneous catalyst reaction and can be easily adapted to a continuous process.

The reaction is carried out by reacting the carbonyl compound with ammonia in the presence of a heterogeneous catalyst such as an ion exchange resin, preferably where the ionic exchange resin is anionic. In general the reaction is carried out by contacting stoichiometric amounts of reactants at a temperature of from about 0°–100°C, such as from about 0° to 50°, for example from about 10° and 40°, but preferably at ambient temperature such as at about 15° to 30°C. Since the reactants are volatile, super - atmospheric pressure, although not required, is generally employed.

Time of reaction, which can vary depending on conditions, temperature, reactant, pressure, etc., should be sufficient to complete the reaction such as from about 1 to 24 hrs., for example from about 1 to 8 hrs., but preferably from about 1 to 3 hrs.

The amount of catalyst employed will vary depending on various factors such as the particular catalyst employed, reactants, temperature, etc. In general, the weight ratio of carbonyl to catalyst is in the range of about 0.1 to 10 or higher, such as from about 0.5 to 7.5, for example from 0.75 to 5, but preferably from about 1 to 3. Since the catalyst is heterogenous, there is really no upper or lower limit for the catalyst, since all that is required is physical contact.

The reaction may be carried out in various ways, batchwise, semi-batchwise, continuous, etc. Since the catalyst is heterogeneous, the reactants can be percolated through the catalyst under proper conditions of temperature, pressure, time, etc., until the reaction is completed. Because of the long life of the catalyst and the ease of separation of reactants and products, the system is ideally useful as a continuous process up a fixed bed, or the catalyst can be repeated.

The reactants, products, and uses for the products and derivatives thereof are the same as those disclosed in Ser. No. 292,494 filed Sept. 27, 1972.

A wide variety of ion exchange resins can be employed in the process. In general, ion exchange resins can be classifiied as 1. strong acid cation exchangers, for example

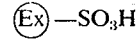

2. weak acid cation exchanger, for example

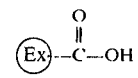

3. strong base anion exchanger, for example

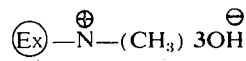

4. weak base anionic exchanger, for example

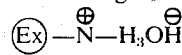

where

represents the resin backbone to which the functional groups are attached.

If proper reaction conditions such as temperature control, ratios, contact time, etc., are employed, all of these types of ion exchange resins can be employed. However, for greater efficiency either a strong acid cation exchanger or a weak base anionic exchanger should be employed. Optimum efficiency is obtained by employing a strong acid cation exchanger.

It is well known that both anionic and cationic exchange resins are complex in structure. Consequently, no specific structure can be assigned to any particular resin. However, it is possible to distinguish strongly basic from weakly basic ion exchange resins. In general, the commercial ion exchange resins vary considerably as to their basic strength, and this is indicated by titration with hydrochloric acid. For example, a representative weakly basic resin is neutralized in the range of pH of about 7 to 2. The degree of adsorption of a weak acid on a weakly basic ion exchange resin is controlled principally by the ionization constant of the acid and can be expressed quantitatively. In general, the weakly basic resins are not sufficiently basic to appreciably neutralize in aqueous solutions such weak acids as silicic acid, carbonic acid, hydrocyanic acid, phenols and the like, whereas the strongly basic resins will neutralize such acids.

In general, a strongly basic ion exchange resin is one which on titration with hydrochloric acid in water free from electrolytes has a pH above about 7.0 when the amount of hydrochloric acid added is one-half of that required to reach the equivalence point. A weakly basic ion exchange resin under the same conditions has a pH below about 7.0 when one-half of the acid required to reach the equivalence point has been added.

A strongly acidic ion exchange resin is one which on titration with sodium hydroxide in water free from electrolytes has a pH below about 7.0 when the amount of sodium hydroxide added is one-half of that required to reach the equivalence point. A weakly acidic ion exchange resin under the same conditions has a pH above about 7.0 when one-half of the sodium hydroxide has been added to the electrolyte-free water to reach the equivalence point.

Representative of the strongly acidic cation exchange resins are those prepared by the sulfonation with sulfuric acid of the copolymer prepared from styrene and divinylbenzene. U.S. Pat. Nos. 2,500,149; 2,466,675, and 2,366,007 are relevant to this class of cation exchange resins. Strongly acidic cation exchange resins can also be prepared by other reactions such as by reacting an aldehyde, a phenol, with a sulfonic acid of sulfite. Typical examples are given in U.S. Pat. Nos. 2,518,420, 2,549,745, 2,525,247, and 3,529,602. Typical of these strongly acidic cation exchange resins are those which can be purchased and are known commercially as "Amberlite IR-120" and "Dowex 50," etc.

Typical of the weakly acidic cation exchange resins are those described in U.S. Pat. No. 2,480,970 prepared by the reaction of phthalic anhydride with phenol using an acid catalyst such as sulfuric acid in the presence of formaldehyde, and those described in U.S. Pat. Nos. 2,340,110 and 2,340,111 comprising a copolymer of a polymerizable mixture of at least one compound having a polymerizable grouping, for example acrylic acid and ethylene dimethacrylate, polymerized in the presence of one percent benzoyl peroxide as a polymerization accelerator.

Weakly basic anion exchange resins can be prepared by the polymerization of amines such as aniline and metaphenylenediamine with formaldehyde or by condensing phenols, formaldehyde and amines. (U.S. Pat. Nos. 2,521,288, 2,485,485, 2,546,938, 2,362,086, 2,442,989, and 2,529,142.) Resins of this type can be purchased and are known commercially as "Amberlite IR-45," "Amberlite IR-4B" and "De Acidite."

The following examples are presented for purposes of illustration and not of limitation.

EXAMPLE 1

2,2,4,4,6-Pentamethyl-2,3,4,5-tetrahydropyrimidine

A sample of 100g of Rexyn RG 50 (H) cation exchanger was added to 115g of 28% aq. $NH_4OH$ and 115g of $H_2O$. The resulting resin was filtered and washed with water and acetone. This catalyst was added to a pressure reactor. A sample of 234g of acetone was added to the resin. Over a 2 minute period 67g of ammonia gas was introduced. The exothermic reaction which took place was kept at 30°C. with cooling. The mixture was stirred for 3 hours. The product was removed from the catalyst through an internal filter. Distillation of the product yielded 178g of 2,2,4,4,-6-pentamethyl-2,3,4,5-tetrahydropyrimidine (86% of theory); $b_{10}$ 55°–56°C; infrared spectrum 3.06$\mu$ weak (N—H) and 6.02 strong (C=N); nuclear magnetic resonance spectrum, δ in ppm, no solvent, 1.88 singlet and 1.84 singlet, 5H; 1.28 singlet, 6H; and 1.04 singlet 6H.

Anal. Calc.ed for $C_9H_{18}N_2$; N, 18.18; Found; N, 17.97

The reaction was repeated 25 times, reusing the same catalyst, with no change in the activity of the catalyst.

EXAMPLE 2

2,2,4,4,6-Pentamethyl-2,3,4,5-tetrahydropyrimidine

Reaction of 234g of acetone and 639g of ammonia in the presence of 191g of Rexyn RG–50 ($NH_4$) for 1 hr. at 32°C, yielded 178g (86% of theory) of 2,2,4,4,6-pentamethyl-2,3,4,5-tetrahydropyrimidine. The reaction was repeated 25 times, reusing the same catalyst, with no change in activity of the catalyst.

EXAMPLE 3

2,2,4,4-Di-pentamethylene-5,6-tetramethylene-2,3,4,5-tetrahydropyrimidine

A mixture of 294g of cyclohexanone, 48g of ammonia and 91g of Rexyn RG–50 ($NH_4$) was reacted at 30°C as described in example 1 for 1½ hrs. The aqueous phase was separated and the organic layer distilled under diminished pressure from solid KOH to yield 244g of 2,2,4,4-di-pentamethylene-5,6-tetramethylene-2,3,4,5-tetrahydropyrimidine (89% of theory) as a viscous liquid, which solidified upon standing. The reaction was repeated 25 times, reusing the same catalyst, with no change in activity of the catalyst.

EXAMPLE 4

2,4-Di-n-propyl-5-ethyl-2,3,4,5-tetrahydropyrimidine

As described in Example 1, a mixture of 216g of butyraldehyde, 44g of ammonia and 45g of Amberlite IR-120 ($NH_4$) was reacted for 1 hr. at 28°C. The aqueous phase was separated to yield 194g (99% of theory) of 2,4-di-n-propyl-5-ethyl-2,3,4,5-tetrahydropyrimidine.

The same reaction was repeated using Amberlite IR-C–50 as the catalyst.

EXAMPLE 5

Mixed condensation

A mixture of 98g of cyclohexanone, 116g of acetone, and 49.6g of ammonia was reacted for 1 hr. in the presence of 91g of Rexyn RG–50 ($NH_4$) at 32°C. The product was evaporated under diminished pressure to yield 182.3g (94% of theory) of material. The product was shown by g.l.c. to consist of 8 different 2,3,4,5-tetrahydropyrimidines.

In Table I additional experiments are summarized. The reactions were carried out at 30°C. according to the method described in Example 1.

Table I

| Starting Material | Product Substituents in 2,3,4,5-tetrahydropyrimidine | Yield % of Theory | Ex. No. |
| --- | --- | --- | --- |
| Methyl ethyl ketone | 2,4,5,6-tetramethyl-2,4-diethyl and 2,4-dimethyl-2,4,6-triethyl | 92 | 6 |
| Cyclopentanone | 2,2,4,4-di-tetramethylene-5,6-trimethylene | 83 | 7 |
| 2-methyl cyclohexanone | 2,2,4,4-di-(α-methyl)penta-methylene-5,6-methyl tetramethylene | 98 | 8 |
| 3-methyl cyclohexanone | 2,2,4,4-di-(β-methyl)penta-methylene-5,6-methyl tetramethylene | 98 | 9 |
| 4-methyl cyclohexanone | 2,2,4,4-di-(α-methyl)penta-methylene-5,6-methyl tetramethylene | 98 | 10 |
| Propionaldehyde | 2,4-diethyl-5-methyl | 94 | 11 |
| n-heptaldehyde | 2,4-di-n-hexyl-5-n-pentyl- | 96 | 12 |
| Acetone + Methyl ethyl ketone | Mixture of isomers | 88 | 13 |

I claim:

1. A process of preparing a 2,3,4,5-tetrahydropyrimidine which comprises reacting a carbonyl compound from the group consisting of ketones and aldehydes with ammonia in the presence of an ion exchange resin catalyst.

2. The process of claim 1 where the carbonyl compound and ammonia are reacted in stoichiometric amounts.

3. The process of claim 1 where the ion exchange resin catalyst is present in a weight ratio of carbonyl to catalyst of at least about 0.1.

4. The process of claim 3 where the weight ratio of carbonyl to catalyst is about 0.1 to 10 or more.

5. The process of claim 1 where the carbonyl compound is a ketone.

6. The process of claim 1 where the carbonyl compound is an aldehyde.

7. The process of claim 1 wherein the carbonyl compound is selected from the group consisting of acetone, methyl ethyl ketone, cyclopentanone, cyclohexanone, 2-methyl cyclohexanone, 3-methyl cyclohexanone, 4-methyl cyclohexanone, propionaldehyde, butyraldehyde, n-heptaldehyde and mixtures thereof.

8. The process of claim 1 where the ion exchange resin is a sulfonate ion exchange resin.

9. The process of claim 1 where the ion exchange resin is a carboxylate ion exchange resin.

10. The process of claim 1 where the reaction takes place at a temperature of from about 0°C. to about 100°C.

11. The process of claim 10 where the reaction takes place at the ambient temperature.

12. The process of preparing a 2,3,4,5-tetrahydropyrimidine which comprises reacting a stoichiometric amount of acetone and ammonia at a temperature of from about 0°C. to about 100°C. in the presence of a sulfonate ion exchange resin, the weight ratio of acetone to sulfonate ion exchange resin being about 0.1 to about 10.

* * * * *